United States Patent
Chevalier

(10) Patent No.: US 8,295,472 B2
(45) Date of Patent: Oct. 23, 2012

(54) SYSTEM AND METHOD FOR INCORPORATING CUSTOMER HANG-UPS AND WEB SUBMISSIONS INTO A PHONECALL-BASED SUPPORT WORKFLOW

(75) Inventor: David Chevalier, Barrington, NH (US)

(73) Assignee: International Business Machines Corporation, Armonk, NY (US)

( * ) Notice: Subject to any disclaimer, the term of this patent is extended or adjusted under 35 U.S.C. 154(b) by 1443 days.

(21) Appl. No.: 11/852,792

(22) Filed: Sep. 10, 2007

(65) Prior Publication Data

US 2009/0067612 A1  Mar. 12, 2009

(51) Int. Cl.
*H04M 3/00* (2006.01)
(52) U.S. Cl. ......... 379/266.02; 379/209.01; 379/210.01; 379/265.09; 379/265.11
(58) Field of Classification Search .............. 379/209.01, 379/210.01, 265.01, 265.02, 265.09, 265.1, 379/265.11, 266.01, 266.03
See application file for complete search history.

(56) References Cited

U.S. PATENT DOCUMENTS 6,665,396 B1 * 12/2003 Khouri et al. ............ 379/266.01
2003/0235288 A1 * 12/2003 McCormack ............ 379/265.02

* cited by examiner

*Primary Examiner* — Antim Shah
(74) *Attorney, Agent, or Firm* — Cantor Colburn LLP; Ayla Lari

(57) ABSTRACT

A method for managing calls and web-submissions includes receiving a web-submission at a first time; generating a first ticket associated with the web-submission; generating a first digital file indicating both the first ticket and that the web-submission was received from a system; storing the first ticket and the first digital file in a first record of a queue; receiving a live call at a second time; generating a second ticket associated with the live call; generating a second digital file when the live call changes into a hang-up call before being serviced by an agent, the second digital file indicating both the second ticket and that the live call was received from a device; storing the live call or the second ticket and the second digital file in a second record of the queue, the first record being positioned in the queue before the second record, the queue being configured to have the first record being serviced before the second record.

13 Claims, 3 Drawing Sheets

SYSTEM AND METHOD FOR INCORPORATING CUSTOMER HANG-UPS AND WEB SUBMISSIONS INTO A PHONECALL-BASED SUPPORT WORKFLOW

BACKGROUND OF THE INVENTION

1. Field of the Invention

This invention relates to a call management system, and particularly to a system and method of managing customer tickets in a call distribution network having a queue by generating a digital recording for web submissions and hang-up calls.

2. Description of Background

Telephone call centers or call centers house a number of operators or agents that are networked together and provide customer service to customers. In a call center situation, agents work service tickets that are generated for a particular customer. The tickets fall into one of three classes: live phone calls, web submissions, or customer hang-ups (treated as callback requests). These tickets are supported by an agent in the order in which they were queued, regardless of which of the three classes a ticket falls into.

However, this can lead to problems when using a software system such as Call Center for Retain in an Aspect™ phone system. In such a system, an agent cannot simply enter a "Ready" state (connect to a live call) on the Aspect phone system when the agent begins a phone shift or has finished working a ticket because the next ticket may not be an actual live call; rather, it may be a hang-up or a web submission. In other words, the Aspect phone system allows a user to simply connect to a live call by a press of a button or by simply picking up the phone without considering whether or not the next ticket needed to be serviced by the agent is a hang-up or a web submission by a customer rather than an actual live call.

In order to remedy this problem, agents calculate how long the next ticket has been waiting and compare that calculated time to the wait time for the longest waiting live call. Another software system, such as CustomView, is employed with this process that provides the agent the wait time for the longest waiting live call. If these two times match or are equal, then the agent enters the "Ready" state and takes the live call, as it is likely to be the next submission. If the next ticket has been waiting longer than the longest waiting live call, the agent concludes that the ticket is a web submission or a hang-up and proceeds to call the customer back or research and respond via email. As such, taking the next live call will not disservice customers who have submitted a web submission or called and hung-up before a live call. However, the process described above is not efficient and often can be tedious for agents. Moreover, inevitable mistakes can often take rise over time, such as calculating the wrong time difference, which can cause already impatient customers to wait more than is their due.

Another problem with this process is that engineers from other teams are able to call into the phone queues of the system and jump in front of customers. If agents or support engineers are working many web submissions or hang-ups as described above, that engineer may not get conferenced in with the priority he would if agents were able to simply take the next live call, since the time spent of the engineer waiting may not be as long as existing web submissions and hang-ups.

SUMMARY OF THE INVENTION

The shortcomings of the prior art are overcome and additional advantages are provided through the provision of a method for managing customer calls and web submissions in a call management system, the method comprising: receiving a web submission at the call management system at a first time; generating a first ticket number associated with the web submission utilizing the call management system; generating a first digital recording file indicating both the first ticket number and that the web submission was received from an internet-based system; storing the first ticket number and the first digital recording file in a first record of a storage queue; receiving a live call at the call management system at a second time; generating a second ticket associated with the live call utilizing the call management system; generating a second digital recording file when the live call changes into a hang-up call before being serviced by a service agent, the second digital recording file indicating both the second ticket number and that the live call was received from a communication device; storing the live call or the second ticket number and the second digital recording file in a second record of the storage queue, the first record being positioned in the storage queue before the second record, the storage queue being configured to have the first record being serviced before the second record; and generating a first audio message when the service agent accesses the storage queue based on the first digital recording file.

The shortcomings of the prior art are overcome and additional advantages are provided through the provision of a call management system for managing customer calls and web submissions, the system comprising: a ticket generator device configured for generating a first ticket number associated with a web submission and generating a second ticket number associated with a live call, the web submission being received at the call management system at a first time and the live call being received at the call management system at a second time; a call generator device in signal communication with the ticket generator device, the call generator device is configured for generating a first digital recording file indicating both the first ticket number and that the web submission was received from an internet-based system, the call generator device further configured for generating a second digital recording file when the live call changes into a hang-up call before being serviced by a service agent, the second digital recording file indicating both the second ticket number and that the live call was received from a communication device; a storage queue in signal communication with the call generator device, the storage queue is configured for storing the first ticket number and the first digital recording file in a first record of a storage queue and storing the live call or the second ticket number and the second digital recording file in a second record of the storage queue, the first record being positioned in the storage queue before the second record, the storage queue being configured to have the first record being serviced before the second record; and a plurality of workstations in signal communication with the storage queue, the plurality of workstations is configured for generating a first audio message when the service agent accesses the storage queue based on the first digital recording file.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for managing customer tickets in a call distribution network by generating a digital recording for web submissions and hang-up calls and placing those recordings along with live calls in a storage queue of a queue management unit.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
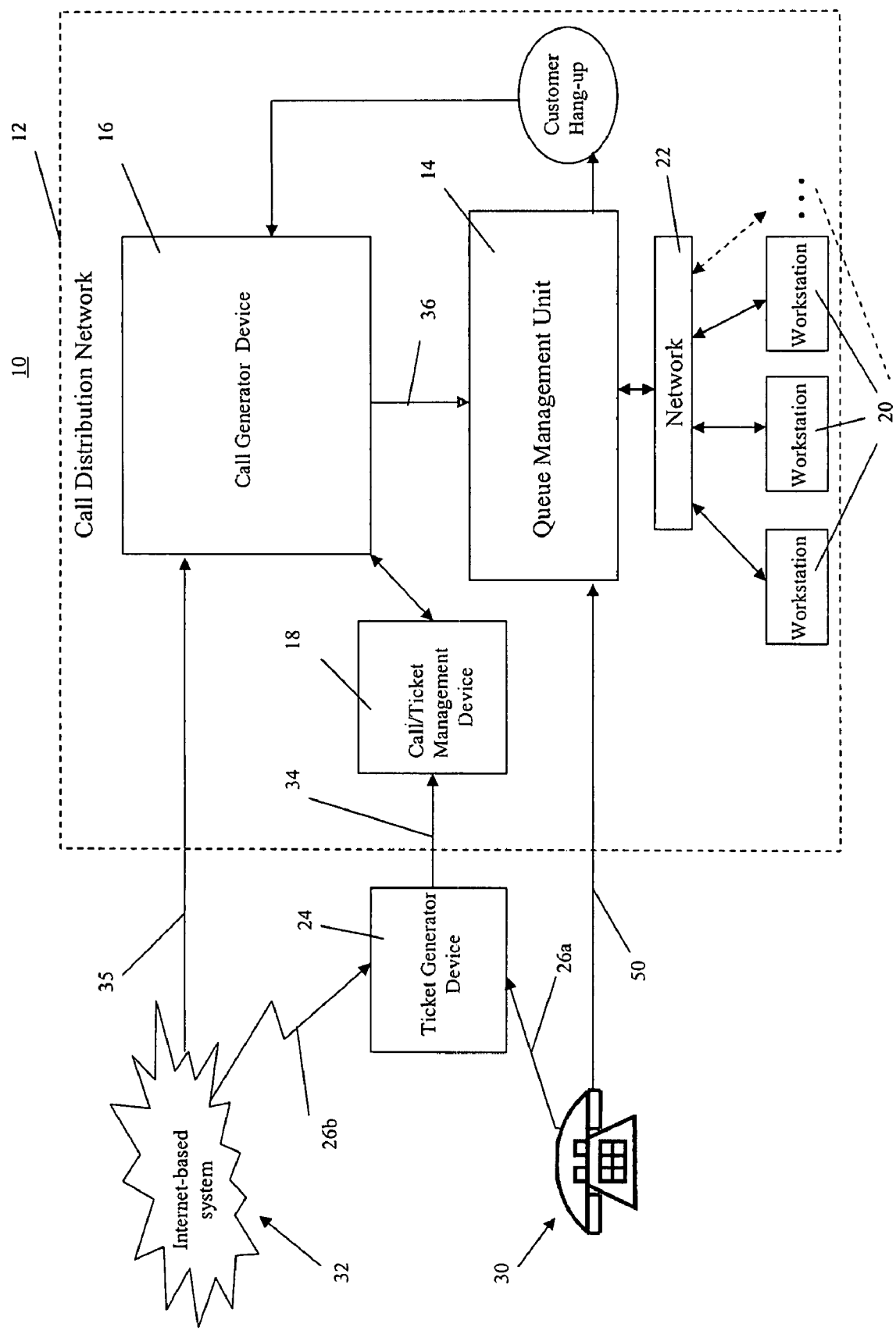
FIG. 1 illustrates a schematic diagram of a system for managing customer tickets in a call distribution network in accordance with one exemplary embodiment of the present invention.

The detailed description explains the preferred embodiments of the invention, together with advantages and features, by way of example with reference to the drawings.

DETAILED DESCRIPTION OF THE INVENTION

Exemplary embodiments of a call management system and a method of using the same in accordance with the present invention will now be described with reference to the drawings. The exemplary embodiment of a call management system described herein is configured to receive a web submission at the call management system at a first time. The exemplary embodiment of a call management system described herein is further configured to generate a first ticket number associated with a web submission utilizing the system. The exemplary embodiment of a call management system described herein is further configured to generate a first digital recording file indicating both a first ticket number and that a web submission was received from an internet-based system. The exemplary embodiment of a call management system described herein is further configured to store a first ticket number and a first digital recording file in a first record of a storage queue. The exemplary embodiment of a call management system described herein is further configured to receive a live call at the system at a second time. The exemplary embodiment of a call management system described herein is further configured to generate a second ticket associated with a live call utilizing the system. The exemplary embodiment of a call management system described herein is further configured to generate a second digital recording file when a live call changes into a hang-up call before being serviced by a service agent, where the second digital recording file indicates both a second ticket number and that the live call was received from a communication device. The exemplary embodiment of a call management system described herein is further configured to store a live call or a second ticket number and a second digital recording file in a second record of a storage queue, where a first record is positioned in the storage queue before the second record and the storage queue is configured to have the first record serviced before the second record. The exemplary embodiment of a call management system described herein is further configured to generate a first audio message when the service agent accesses a storage queue based on a first digital recording file.

The inventors herein have recognized that having a process of incorporating all types of tickets (e.g., live calls, web submissions, hang-ups) in a phone-based workflow of a phone system by generating a recording for web submissions and hang-ups and placing those recordings along with live calls in a storage queue of the system can form a more efficient system that eliminates the need for any calculations to be made before each and every call taken. The inventors herein have further recognized that giving the priority that is due to a hang-up call by substituting the live call in the storage queue which later changed into the hang-up call with a digital recording file that is representative of the hang-up call will maintain priority between live calls, web submissions, and hang-up calls. The inventors herein have further recognized that by generating an audio message of the digital recordings files will permit a service agent to easily move from ticket to ticket in a continuous workflow. For example, a service agent may use a phone system to service web submissions, live calls, and hang-up calls by simply entering a "Ready" state (e.g., answering a phone) on the phone system since web submissions and hang-up calls are represented by digital recording files.

As used herein, "live call" is intended to describe an active call or an incoming call where the customer is actively waiting on the other line of a communication device, such as a phone, to be serviced by an agent. As used herein, "hang-up call" is intended to describe an inactive call, which was previously an active call or "live call", where the customer is no longer waiting on the other line to be serviced by an agent, rather has disconnected communication with the agent. For all general purposes, a hang-up call is treated as a callback request. As used herein "web submission" is intended to describe an email or some form of message submitted for an agent to service using an internet-based system in accordance to one embodiment of the present invention.

Generally speaking, and in accordance with one embodiment of this invention, a call management system is provided that employs a process of incorporating all types of tickets or requests (e.g., live calls, web submissions, and hang-up calls) into a phone-based workflow. In one embodiment, the process employed generally includes receiving a web submission at the call management system at a first time. In one embodiment, the process further includes generating a first ticket number associated with the web submission utilizing the call management system. In one embodiment, the process further includes generating a first digital recording file indicating both the first ticket number and that the web submission was received from an internet-based system. In one embodiment, the process further includes storing the first ticket number and the first digital recording file in a first record of a storage queue. In one embodiment, the process further includes receiving a live call at the call management system at a second time. In one embodiment, the process further includes generating a second ticket associated with the live call utilizing the call management system. In one embodiment, the process further includes generating a second digital recording file when the live call changes into a hang-up call before being serviced by a service agent, the second digital recording file indicating both the second ticket number and that the live call was received from a communication device. In one embodiment, the process further includes storing the live call or the second ticket number and the second digital recording file in a second record of the storage queue, the first record being positioned in the storage queue before the second record, the storage queue being configured to have the first record being serviced before the second record. In one embodiment, the process further includes generating a first audio message when the service agent accesses the storage queue based on the first digital recording file.

The digital recordings files representative of web submissions and hang-up calls are placed in the storage queue along with the live calls based on the ticket number associated with the digital recording files and the live calls, where the most recently queued recording or live call is placed on the bottom of the queue. In one embodiment, the call (live call or recording) positioned on the top of the queue is serviced first when the queue is accessed for servicing from a service agent. In this case, the queue is worked from the top to the bottom, thus giving priority to the call waiting longest in the queue. Consequently, the workflow of moving from ticket to ticket can be reduced to a single, simple action since the web submissions and hang-up calls are placed as recordings in the storage queue with the live calls.

For a better understanding of the invention and its operation, turning now to the drawings, FIG. 1 illustrates a call management system 10 in accordance with one embodiment of the present invention. The system 10 includes a call distribution network or center 12 comprising a queue management unit 14, a call generator device 16, a ticket management device 18, and a plurality of workstations 20 in signal communication with queue management unit 14 via a network 22 as shown. Moreover, system 10 includes a ticket generator device 24 in signal communication with ticket management device 18 of call distribution network 12. In one embodiment, ticket generator device 24 is part of call distribution network 12 or located within another network.

In one exemplary embodiment, ticket generator device 24 cooperatively operates with call distribution network 12 in managing tickets or calls, such as live calls or oncoming calls, web submissions, and hang-up calls (treated as callback requests) in accordance to one embodiment. Ticket generator device 24 is in signal communication with ticket management device 18 in accordance with one embodiment. The ticket generator device 24 is configured to receive live calls or web submissions via communication line 26a, 26b respectively. The ticket generator device 24 is further configured to generate a ticket number or a software-based tracking ticket for each corresponding live call or web submission in accordance with one embodiment. The live calls can be made through a communication device 30, such as a telephone for example. Of course, other known communication devices can be used to make live calls such as, for example, a cell phone of any type of model in accordance to one embodiment. The web submissions can be submitted through an internet-based system 32, such as a personal computer. Of course, other known devices or systems can be used to submit a web submission via the Internet such as, a personal digital assistant (PDA) in accordance with one embodiment of the present invention.

Each of the live calls and the web submissions has a phone address (e.g., telephone number) and an email address respectively associated with it. As such, a service agent can easily contact back the customer who submitted the web submission or made the live call and hung-up (hang-up call) before the service agent could service the customer.

In operation, when a customer makes a live call or submits a web submission in order to be serviced by an agent, ticket generator device 24 receives the live call or web submission and generates a ticket number or a software-based tracking ticket for the corresponding live call or web submission in accordance with one embodiment. The ticket generator device 24 further assigns the ticket number to the live call or the web submission once the ticket number is generated in accordance with one embodiment. In other words, ticket generator device 24 generates and assigns a ticket number to each live call made and each web submission submitted by a customer operating the communication device 30 or the internet-based system 32. As such, a ticket number is associated with each live call and web submission, thus assisting in identifying the customer who made the live call through the phone address or email address corresponding to each live call or web submission respectively. In accordance with one embodiment, the ticket number associated with each live call and web submission permits the service agent to determine which phone address or email address is associated with the live call or web submission in which the ticket number was assigned to. This may be accomplished through the use of the plurality of workstations 20 in which at least one service agent operates, which will be described in greater detail below.

Advantageously, in the instance when the customer hangs-up before being serviced by a service agent, the agent can identify the customer based on the ticket number associated with the live call that later changed into the respective hang-up call, in order to call the customer back. In the instance when the customer submits a web submission, the agent can similarly identify the customer based on the ticket number assigned to the web submission and respond via email or contact the customer through other means, such as a telephone.

In accordance with one exemplary embodiment, the ticket management device 18 of call distribution network 12 is in signal communication with ticket generator device 24. In one embodiment, the ticket management device 18 includes a memory (not shown) that stores the ticket number assigned to the live calls and web submissions for identifying the same. As such, once ticket generator device 24 assigns a ticket number to the live call or the web submission, ticket generator device 24 forwards the ticket number assigned to the live call or the web submission to ticket management device 18 via a communication line 34 in accordance to one embodiment. The ticket management device 18 further stores related identifying information pertaining to the live call and web submission, such as the phone address or the email address. As such, the ticket number is associated with a live call having a particular phone address and a web submission having a particular email address. Once this identifying information is forwarded to ticket management device 18, ticket management device 18 stores the ticket number along with other identifying information in memory for later retrieval from call generator device 16, which will be described in greater detail below. It is contemplated that ticket generator device 24 stores the ticket number assigned to the live calls and web submissions along with other identifying information for later retrieval from call generator device 16.

In accordance with one exemplary embodiment of the present invention, call generator device 16 is in signal communication with ticket management device 18 and queue management module 14. The call generator device 16 is configured to generate a digital recording file or recording for each web submission and hang-up call. As such, the digital recording file for each web submission is representative of the respective web submission for all purposes. Similarly, the digital recording file for each hang-up call is representative of the respective hang-up call for all purposes. The digital recording file for each web submission is a digitally recorded message stating that the call is a web submission along with a recitation of the ticket number associated with the web submission, which call generator device 16 receives from ticket management device 18 in accordance with one embodiment.

In operation, when a customer submits a web submission, the web submission is sent to ticket generator device 24 for a ticket number and call generator device 16 for a generated digital recording file via a communication line 35. The call generator device 16 uses the email address corresponding to the web submission to determine which ticket number to obtain from ticket management device 18 and generate the digital recording file for the web submission as described above. As such, the web submission and consequently, the digital recording file for the web submission, are associated with the ticket number assigned to the web submission. For example, if a web submission was assigned a ticket number 0002, the call generator device 18 generates a digital recording for the web submission using ticket number 0002 from ticket management device 18.

In accordance with one embodiment, the digital recording file for each hang-up call is a digitally recorded message stating that the customer has requested a call back along with a recitation of the ticket number associated with the live call (the previous status of the hang-up call), which call generator device 16 receives from ticket management device 18 in accordance with one embodiment. In operation, when a customer makes a live call, the live call is sent to queue management unit 14 to be stored and ticket generator device 24 for a ticket number. When the customer decides to change the live call into a hang-up call before being serviced by a service agent, the hang-up call activates call generator device 16 to generate a digital recording file for the hang-up call as described above. The call generator device uses the phone address corresponding to the live call that changed into the hang-up call to determine which ticket number to obtain from ticket management device 18 and generate the digital recording file for the hang-up call as described above. As such, the hang-up call and consequently, the digital recording file for the hang-up call, are associated with the ticket number assigned to the respective live call, which changed into the hang-up call. For example, if a live call was assigned a ticket number 0001 and changed into a hang-up call, the call generator device 18 generates a digital recording for the hang-up call using ticket number 0001 from ticket management device 18.

In accordance with one exemplary embodiment, call generator device 16 forwards the respective ticket number along with the digital recording file and other identifying information via a communication line 36 for each hang-up call and web-submission to queue management unit 14. Advantageously, web submissions and hang-up calls may be treated as actual calls that are received by an agent. It should be understood that the recorded message for each web submission and hang-up call can be generated in many forms and in various languages and should not be limited to the examples set forth above.

Figure 2:
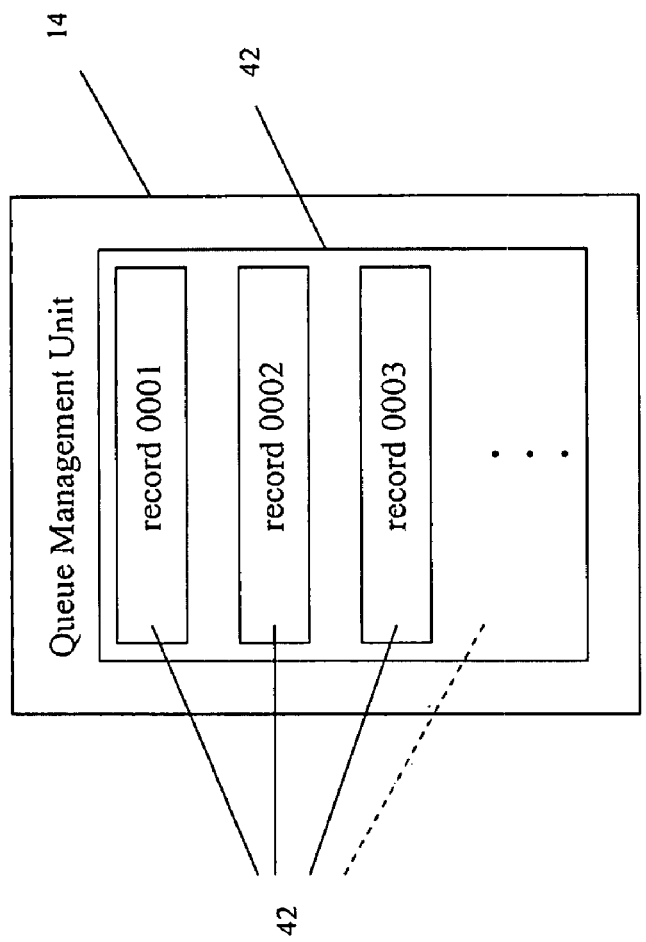
FIG. 2 illustrates a queue management unit of the system in accordance with one exemplary embodiment of the present invention.

In one embodiment, queue management unit 14 within call distribution center 12 includes a storage queue 40 for receiving live calls, the digital recording files of web submissions, and the digital recording files of hang-up calls as shown in FIG. 2. The storage queue includes records or queue records 42 each having a record number (e.g., record 0001). The records 42 are configured to correspondingly store the live calls, the digital recording files of web submissions, and the digital recording files of hang-up calls therein. In one embodiment, the order of the record numbers for the records 42 correspond to the ticket numbers associated with each live call and web submission. In other words, the ticket number associated with each live call and web submission correspond to the order in which the records 42 are positioned within storage queue 40. As such, priority is not lost between live calls, web submissions, and hang-up calls. For example, record 0001 of storage queue 40 corresponds to ticket number 0001 assigned to either a live call or web submission, record 0002 of storage queue 40 corresponds to ticket number 0002 assigned to either a live call or web submission, and so on. The ticket numbers along with the record numbers for the records 42 in storage queue 40 are both in ascending order, where the ticket number and the record number having the highest number indicates the most recent call (live call or web submission) in accordance with one embodiment. In one embodiment, one record having record number 0001 is positioned on the top of the storage queue 40, while another record having record number 0002 is positioned in the bottom of the storage queue 40. As such, the first live call or web submission will be given the first ticket number 0001 and will be stored in storage queue 40 in the queue record having record number 0001, thus will be serviced before ticket number 0002.

In one embodiment, the digital recording files for web submissions and hang-up calls are stored within storage queue 40 based on each of their respective ticket number forwarded from call generator device 16. On the other hand, the live calls are stored in one of the records 42 of storage queue 40 as soon as such oncoming calls are made and remain within storage queue 40 until a service agent services the customer who made the live call. In one embodiment, a digital recording file of a hang-up call substitutes the live call stored within one of the records 42 when the live call changes into the respective hang-up call as described above. The queue management unit 14 substitutes the live call with the digital recording file of the hang-up call using the ticket number assigned to the live call because the ticket number assigned to the digital recording file of the hang-up call corresponds to the record number of the record queue the live call is stored in. In doing so, hang-up calls keep their priority in storage queue 40 based the ticket number assigned to the live call that corresponds to the hang-up call.

In accordance with one exemplary embodiment, live calls, hang-up calls, and web submissions are serviced based on the record number of the record in the storage queue in which each is stored, where customer hang-up calls and web submissions are substituted in the storage queue 40 by the digital recording files of each.

In accordance with one exemplary embodiment, the most recently queued live call or digital recording file is placed on the bottom of the storage queue so that the live call or recording file waiting the longest in storage 40 has priority and is serviced first by an available service agent when such agent access the queue management unit 14.

In accordance with one exemplary embodiment, the workstations 20 are configured to access storage queue 40. The workstations 20 each comprise of a communication device, such as a telephone system. An agent accesses storage queue 40 of queue management unit 14 using one of the workstations 20 via the network 22 in accordance with one embodiment. Once the available service agent accesses storage queue 40 using workstation 20, queue management unit 14 connects the agent to the live call or digital recording file located on top of the storage queue 40, which is considered to have been stored in the storage queue 40 the longest. In one embodiment, the agent operates one of the workstations 20 and is connected to a call, which can be a live call or a digital recording file for a web submission or a hang-up call. In one embodiment, each of the workstations 20 is configured to generate an audio message for each of the digital recording files for a web submission or a hang-up call when the service agent access the storage queue 40 through the respective workstation. In operation, when the service agent accesses queue 40 through one of the workstations, the call (live call or recording) stored on the top of the queue 40 is connected to the service agent. When the call is a live call, the service agent is directly connected to the customer who made the live call. When the call is a digital recording file of a web submission or a hang-up call, the workstation takes the digital recording file and generates an audio message to the service agent that recites the message created for the digital recording file. In this case, the service agent takes the ticket number recited in the audio message and looks up the corresponding phone address or email address of the respective hang-up call or web submission stored in the storage queue 40 and services the customer who made the hang-up call or submitted the web submission accordingly. It is contemplated that the queue management unit 14 generates an audio message for each of the digital recording files in accordance with one exemplary embodiment.

Figure 3:
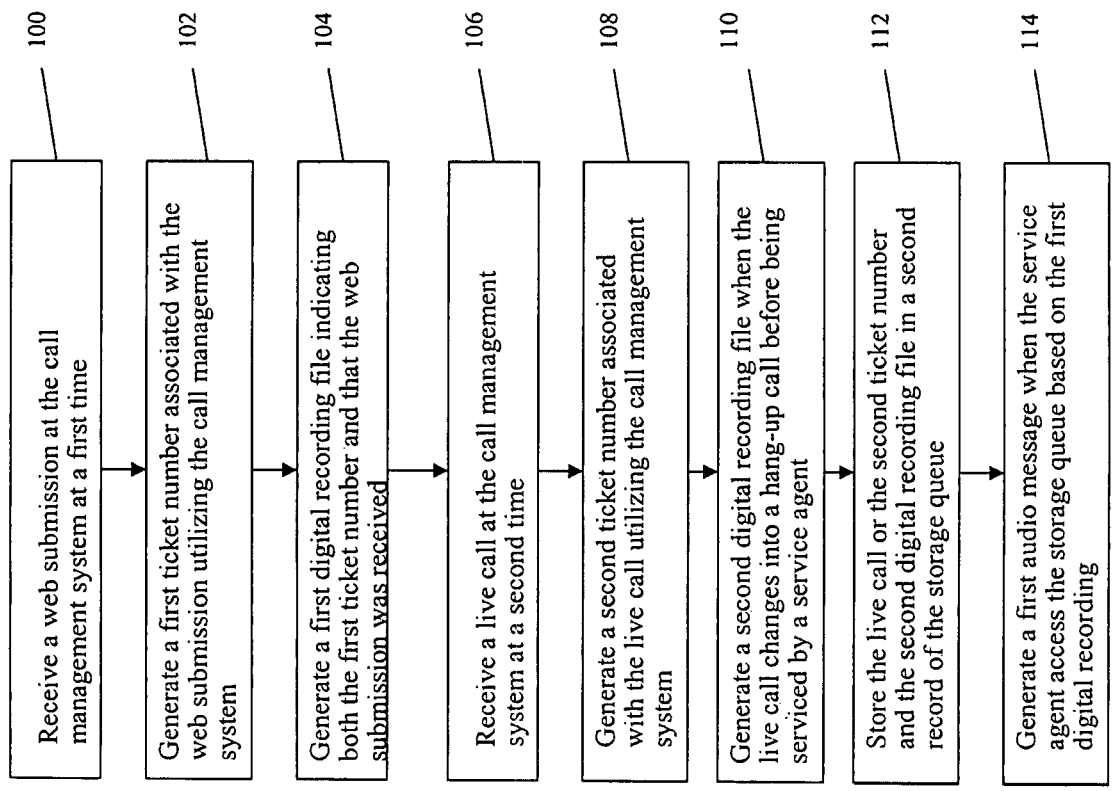
FIG. 3 illustrates a flowchart diagram that illustrates a method for managing customer calls and web submissions in accordance with one exemplary embodiment of the present invention.

In accordance with an exemplary embodiment of the present invention, an exemplary method for managing customer calls and web submissions in a call management system is provided and illustrated in FIG. 3. In this exemplary method, receive a web submission at the call management system at a first time at block 100. Next, generate a first ticket number associated with the web submission utilizing the call management system at block 102. Then, generate a first digital recording file indicating both the first ticket number and that the web submission was received at block 104. The web submission may be received from an internet-based system, such as a personal computer in accordance with one embodiment. At block 106, receive a live call at the call management system at a second time. At block 108, generate a second ticket number associated with the live call utilizing the call management system. Then, generate a second digital recording file when the live call changes into a hang-up call before being serviced by a service agent at block 110. The second digital recording file indicates both the second ticket number and that the live call was received from a communication device in accordance with one embodiment. Next, store the live call or the second ticket number and the second digital recording file in a second record of the storage queue at block 112. In this block, the first record is positioned in the storage queue before the second record and the storage queue is configured to have the first record being serviced before the second record. At block 114, generate a first audio message when the service agent access the storage queue based on the first digital recording. In an alternative method, the live call is received at the call management system at the first time and the web submission is received at the call management system at the second time.

It should be appreciated that the call distribution center 12 and ticket generator device 24 can be part of or located at distant portions of a distributed network, a telecommunications network, and intranet and/or the Internet, or within a dedicated network services platform separately or together.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for managing customer calls and web submissions in a call management system, the method comprising:
   receiving a web submission at the call management system at a first time;
   generating a first ticket number associated with the web submission utilizing the call management system;
   generating a first digital recording file configured to generate a first audio message stating both the first ticket number and that the web submission was received from an internet-based system;
   storing the first ticket number and the first digital recording file in a first record of a storage queue;
   receiving a live call at the call management system at a second time;
   generating a second ticket associated with the live call utilizing the call management system;
   generating a second digital recording file when the live call changes into a hang-up call before being serviced by a service agent, the second digital recording file configured to generate a second audio message stating both the second ticket number and that the live call was received from a communication device;
   storing the live call or the second ticket number and the second digital recording file in a second record of the storage queue, the first record being positioned in the storage queue before the second record, the storage queue being configured to have the first record being serviced before the second record;
   generating the first audio message when the service agent accesses the first digital recording file in the storage queue; and
   wherein generating the second digital recording file when the live call changes into the hang-up call before being serviced by the service agent
   comprises:
     detecting that the live call has changed to the hang-up call;
     generating the second digital recording file based on detecting that the live call has changed to the hang-up call; and
     associating the second digital recording file with the second ticket number corresponding to the live call.

2. The method as in claim 1, further comprising generating a the second audio message when the service agent accesses the second digital recording file in the storage queue.

3. The method as in claim 1, wherein the service agent accesses the storage queue through a workstation, the workstation being in signal communication with the storage queue.

4. The method as in claim 3, wherein the workstation is configured to generate the first audio message for the service agent.

5. The method as in claim 1, wherein the first ticket number and the second ticket number are each generated by a ticket generator device of the call management system when the web submission and the live call are correspondingly received by the ticket generator device.

6. The method as in claim 1, wherein the first digital recording file and the second digital recording file are generated by a call generator device.

7. The method as in claim 1, wherein the second ticket number and the second digital recording file are stored in the second record when the live call changes into the hang-up call.

8. The method as in claim 1, wherein the live call is stored in the second record when the live call remains active until the service agent services the live call.

9. A call management system for managing customer calls and web submissions, the system comprising:
- a ticket generator device configured for generating a first ticket number associated with a web submission and generating a second ticket number associated with a live call, the web submission being received at the call management system at a first time and the live call being received at the call management system at a second time;
- a call generator device in signal communication with the ticket generator device, the call generator device configured for generating a first digital recording file for generating a first audio message stating both the first ticket number and that the web submission was received from an internet-based system, the call generator device further configured for generating a second digital recording file when the live call changes into a hang-up call before being serviced by a service agent, the second digital recording file for generating a second audio message stating both the second ticket number and that the live call was received from a communication device;
- a storage queue in signal communication with the call generator device, the storage queue being configured for storing the first ticket number and the first digital recording file in a first record of a storage queue and storing the live call or the second ticket number and the second digital recording file in a second record of the storage queue, the first record being positioned in the storage queue before the second record, the storage queue being configured to have the first record being serviced before the second record;
- a plurality of workstations in signal communication with the storage queue, the plurality of workstations configured for generating the first audio message when the service agent accesses the first digital recording file in the storage queue;
- wherein the storage queue is configured to detect when the live call has changed to the hang-up call; and the call generator device is configured to generate the second digital recording file based on the storage queue detecting that the live call has changed to the hang-up call.

10. The system as in claim 9, wherein the plurality of workstations is further configured for generating the second audio message when the service agent accesses the second digital recording file in the storage queue.

11. The system as in claim 9, wherein the second ticket number and the second digital recording file are stored in the second record when the live call changes into the hang-up call.

12. The system as in claim 9, wherein the live call is stored in the second record when the live call remains active until the service agent services the live call.

13. A method for managing customer calls and web submissions in a call management system, the method comprising:
- receiving a web submission at the call management system;
- generating a first ticket number associated with the web submission utilizing the call management system;
- generating a first digital recording file configured to generate a first audio message stating information about the web submission;
- storing the first ticket number and the first digital recording file in a first record of a storage queue;
- receiving a first live call at the call management system;
- generating a second ticket associated with the first live call utilizing the call management system;
- storing the first live call in a second record of the storage queue;
- receiving a second live call at the call management system;
- generating a third ticket number associated with the second live call utilizing the call management system;
- storing the second live call in a third record of the storage queue, the first record, the second record, and the third record being stored in the storage queue in an order in which the web submission, the first live call, and the second live call were received at the call management system;
- generating a second digital recording file based on detecting that the second live call has changed to a hang-up call, the second digital recording file configured to generate a second audio message stating information about the second live call; and
- storing the second digital recording file in the third record of the storage queue, the first record, the second record, and the third record being stored in the storage queue in an order in which web submission, the first live call, and the second live call were received at the call management system.

* * * * *